March 15, 1927. 1,621,431
C. REBER
EMERGENCY BRAKE MECHANISM
Filed March 20, 1926 3 Sheets-Sheet 1
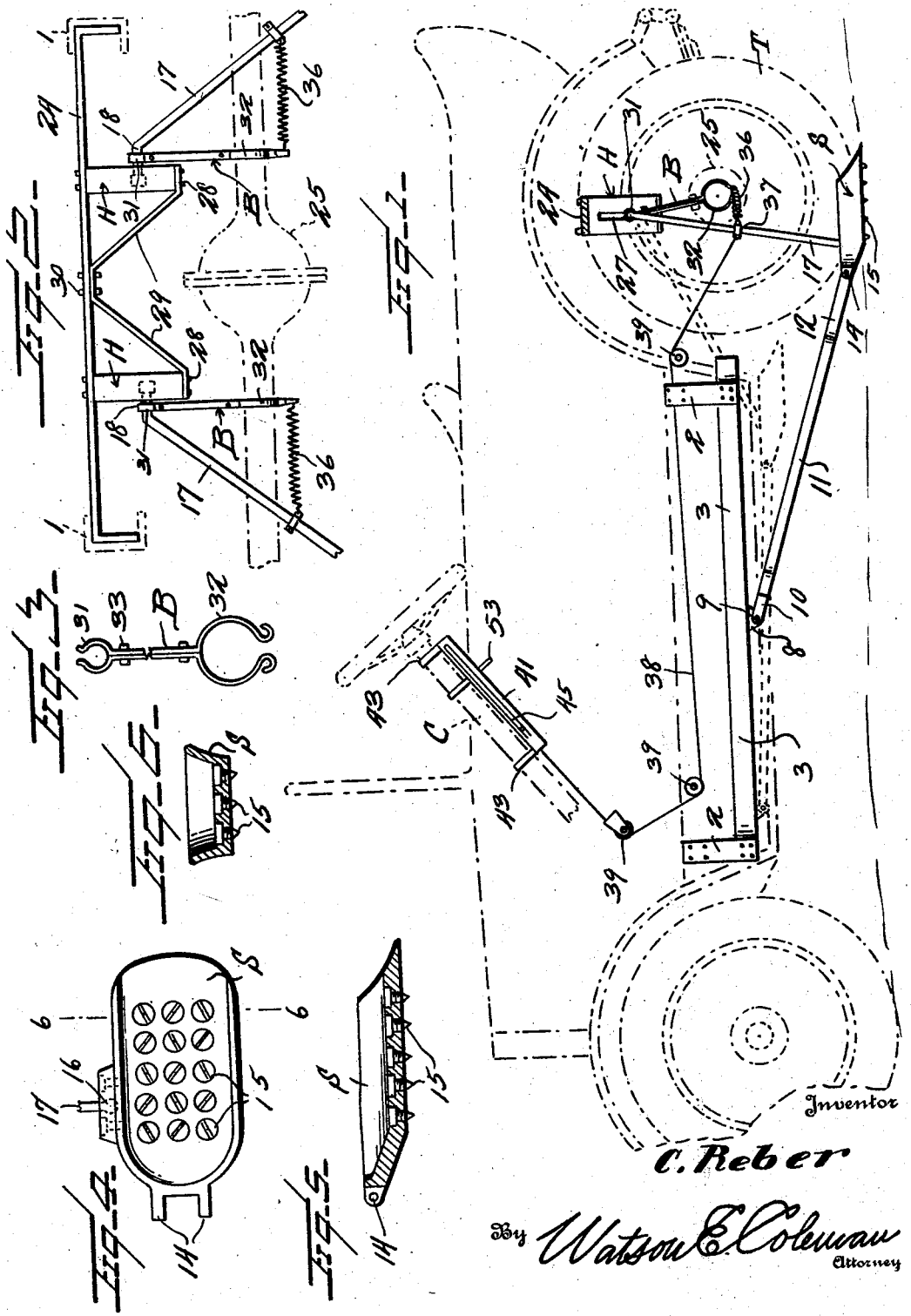
Inventor
C. Reber
By Watson E. Coleman
Attorney March 15, 1927.  1,621,431
C. REBER
EMERGENCY BRAKE MECHANISM
Filed March 20, 1926   3 Sheets-Sheet 2
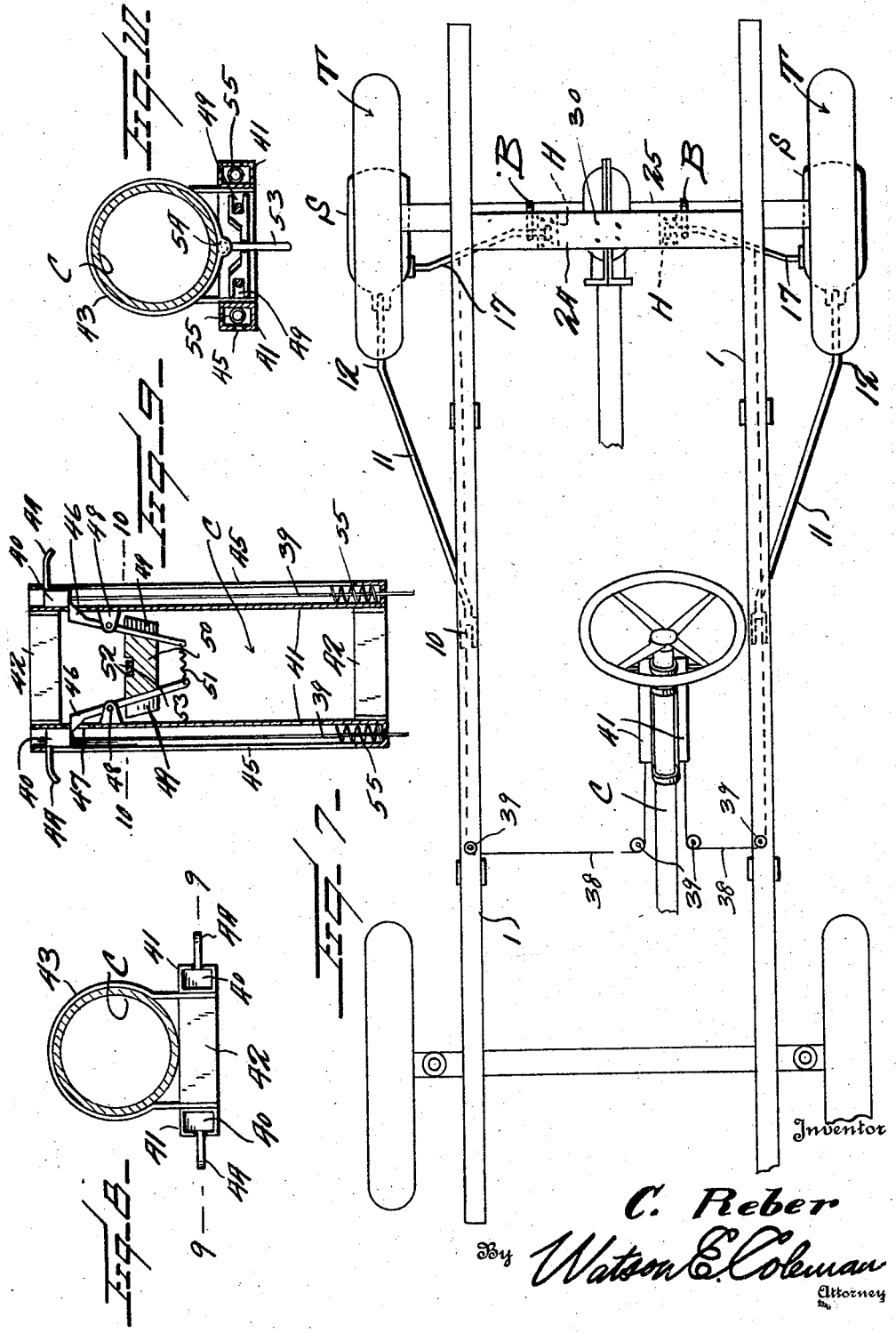
Inventor
C. Reber
By Watson E. Coleman
Attorney March 15, 1927. 1,621,431
C. REBER
EMERGENCY BRAKE MECHANISM
Filed March 20, 1926   3 Sheets-Sheet 3
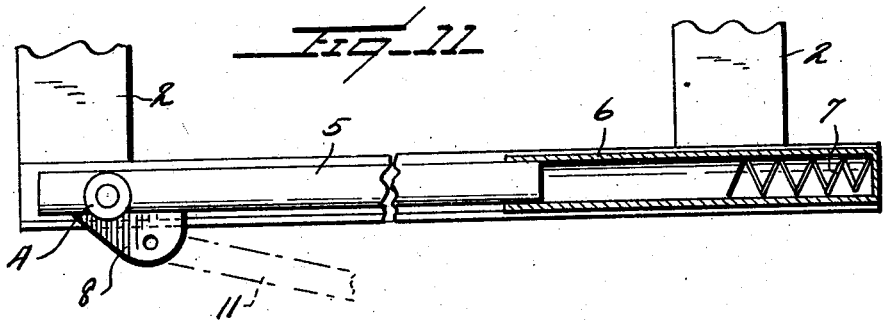
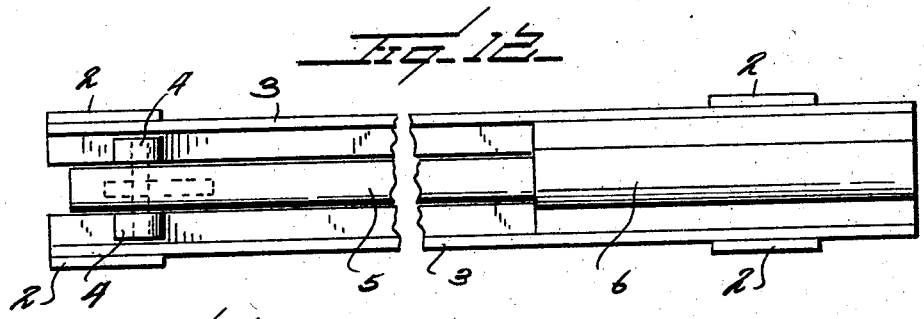
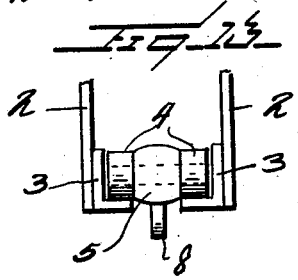
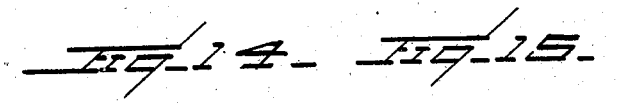
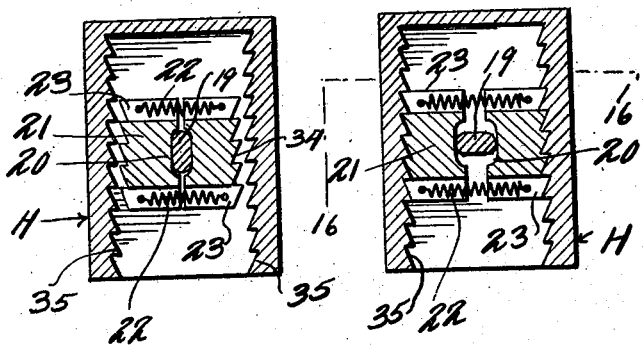
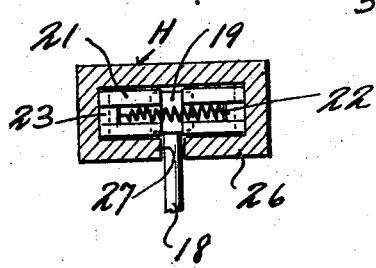
Inventor
C. Reber
By Watson E. Coleman
Attorney Patented Mar. 15, 1927.

1,621,431

UNITED STATES PATENT OFFICE.

CHRISTIAN REBER, OF LINCOLN PARK, MICHIGAN.

EMERGENCY-BRAKE MECHANISM.

Application filed March 20, 1926. Serial No. 96,272.

This invention relates to certain improvements in emergency brake mechanisms and has relation more particularly to a device of this kind especially designed and adapted for use in connection with motor driven vehicles, and it is an object of the invention to provide a mechanism of this kind comprising shoes normally maintained in an inoperative position but each, upon release, being adapted to coact with a drive wheel to provide an effective braking action.

Another object of the invention is to provide a mechanism of this kind comprising shoes normally maintained in an inoperative position, together with means whereby said shoes may be released one independently of the other for braking action upon a drive wheel or released in unison when the requirements of practice may so necessitate.

The invention consists in the details of construction and in the combination and arrangement of the several parts of my improved emergency brake mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with refernce to the accompanying drawings, wherein:—

Figure 1 is a view in side elevation and of somewhat a diagrammatic character illustrating an emergency brake mechanism constructed in accordance with an embodiment of my invention, the coacting vehicle being idicated by broken lines;

Figure 2 is a fragmentary view in rear elevation of a portion of the mechanism as herein disclosed, an adjacent rear axle of the vehicle being indicated by broken lines;

Figure 3 is a view in elevation of one of the brace members herein disclosed to cause a block to lock positively in one position;

Figure 4 is a view in top plan of one of the brake shoes as herein employed;

Figure 5 is a longitudinal sectional view taken through the shoe as illustrated in Figure 4;

Figure 6 is a sectional view taken substantially on the line 6—6 of Figure 4;

Figure 7 is a view in top plan of somewhat a diagrammatic character illustrating the mechanism as herein embodied;

Figure 8 is a view partly in section and partly in top plan illustrating a portion of the releasing mechanism herein employed;

Figure 9 is a sectional view taken substantially on the line 9—9 of Figure 8, with certain of the parts in elevation;

Figure 10 is a sectional view taken substantially on the line 10—10 of Figure 9;

Figure 11 is an enlarged fragmentary view partly in side elevation and partly in section illustrating the mounting of one of the push rods as herein disclosed;

Figure 12 is a view in top plan of the structure as illustrated in Figure 11;

Figure 13 is a view in end elevation of the structure illustrated in Figure 12;

Figure 14 is a fragmentary vertical sectional view of the locking blocks herein disclosed and in release position;

Figure 15 is a view similar to Figure 14 but showing the blocks in locking position;

Figure 16 is a sectional view taken substantially on the line 16—16 of Figure 15.

As disclosed in the accompanying drawings, the side members 1 of the frame of the vehicle have depending therefrom at spaced points thereon the arms 2 which provide supports for the spaced tracks 3. These tracks 3 have riding thereon the rollers 4 operatively supported by an end portion of what may be termed a pull rod 5. The inner end portion of this rod 5 telescopes within a tubular member 6 supported by the tracks 3. Arranged within this member 6 is a spring 7 of requisite tension and operates to absorb the strain or shock which would otherwise be liable to occur about the time the rod 5 reaches the limit of its movement inwardly of the tubular member 6.

The outer end portion of this rod 5 has depending therefrom a web or flange 8 with which is pivotally connected, as at 9, a fork 10 carried by an end portion of an elongated rod 11. The rod 11 is angularly disposed with respect to the fork 10 and extends outwardly with respect to the vehicle frame and terminates in an angular extension 12 pivotally connected, as at 14, with the forward end portion of a brake shoe S. The upper surface of this shoe S is of a configuration to snugly receive the lower tread portion of a tire T carried by a drive wheel of the vehicle and when in working position this shoe S is positioned between the low point of such tire and the surface upon which the vehicle may be traveling.

Extending outwardly from the under surface of the shoe S are the calks 15 which provide means whereby the shoe will effectively grip the road surface and thereby materially increase the braking efficiency of the shoe. The calks 15, as herein disclosed, are threaded through the shoe from above and these calks may be separately removed and replaced as the occasions of practice may require.

In practice, it is preferred that the extension 12 of each of the rods 11 be arranged substantially in parallelism with a side member 1 of the vehicle frame although, of course, this may be varied as desired.

The inner side of the shoe S at a point in close proximity to the forward end thereof has in swiveled connection therewith, as at 16, an end portion of an upwardly and inwardly inclined rod 17 terminating at its upper end in an angular extension 18. This extension 18 is provided at its outer or free extremity with a cross head 19 which, when the shoe S is in its full raised position, as indicated by broken lines in Figure 1, is substantially vertically disposed, as illustrated in Figure 14. When in its vertical position the head 19 is substantially confined in the recesses 20 provided in the opposed faces of the transversely aligned blocks 21, said blocks 21 being constantly urged one toward the other by the retractile springs 22 connecting the upper and lower portions of the blocks 21. Each of these springs 22 is substantially housed within the transversely aligned grooves 23 provided in either the upper or lower faces of the blocks 21.

These blocks 21 are arranged within a housing H depending from a cross member 24 connecting the side members 1 of the vehicle frame at a point above but slightly in advance of the rear axle housing 25 of the vehicle. The outer face 26 of each of the housings H is provided with a vertically disposed elongated slot 27 through which the extension 18 of the adjacent rod 17 is freely disposed thereby permitting proper positioning of the head 19 carried by said extension. The lower end of each of the housings H is initially constructed open as is also the lower end of the slot 27, thus permitting the proper assembly of the blocks 21 and head 19 within the housing. After such assembly, the lower open end of each of the housings H is closed by an end portion 28 of a brace member 29 extending upwardly and inwardly and suitably secured, as at 30, to the central portion of the member 24.

Interposed between the extension 18 of each of the rods 17 and the rear axle housing 25 is a brace member B, the upper end portion of said brace member being provided with the jaws 31 receiving therebetween the extension 18 while the opposite or lower end portion of the member B is provided with the jaws 32 straddling the axle housing 25 from above. This brace member B preferably comprises two separable duplicate sections maintained in desired assembled relation by the bolts 33 or the like operatively engaged with the intermediate portions thereof.

The brace members B, when the blocks 21 are in their release position, as illustrated in Figure 14, serve to hold said blocks, through the instrumentality of the head 19 against downward movement. Each of the slots 27 is of a length to readily permit relative movement between the vehicle frame and the rear axle housing in accordance with the variance of the vehicle load or such relative movement incident to travel.

When the head 19 is in its normal or substantially vertical position the blocks 21 are free from the associated housing H but when said blocks 21 are moved outwardly as a result of turning movement of the head 19, as indicated in Figure 15, the upwardly facing ratchet teeth 34 provided on the outer faces of the blocks 21 will interlock with the downwardly facing ratchet teeth 35 provided on the inner faces of the adjacent walls of the housing H thereby effectively locking the blocks and housing against relative movement in one direction. The head 19 is turned from its vertical position, as illustrated in Figure 14, to a substantially horizontal position, as illustrated in Figure 15, when a shoe S is released for engagement beneath the tire T of a wheel. As the shoe drops downwardly, the head 19 is rotated and when the shoe S is properly positioned beneath a wheel, the blocks 21 are effectively interlocked with the associated housing H whereby side strain on the coacting wheel is effectively taken up as might be caused by swerving or skidding.

As the shoe swings downwardly into braking position, the pull rod 5 moves inwardly of the tubular member 6. This relative movement between the rod 5 and the tubular member 6 assures the shoe S having downward swinging movement in the requisite path of travel to bring the same into proper position with respect to the coacting wheel. After the shoe initially comes into engagement with the wheel, the continued advance of the vehicle will cause the wheel to ride thereon, thus assuring an effective emergency brake.

To assure the desired downward movement of each of the shoes I interpose between and secure to each of the rods 17 and the lower portion of the adjacent bracket B a retractile coil spring 36. Each of the springs 36 is connected to a rod 17 through the medium of a member 37 clamped to such rod and also connected to this member 37 is an end portion of a flexible member 38. This member 38 engages suitably positioned guide pulleys 39 and extends upwardly of the steering gear column C and connected to a block 40. This block 40 is freely mounted within a tubular member 41 having its opposite end portions suitably affixed to the cross blocks 42, said blocks 42 being anchored, as at 43, to the steering column C. The block 40 is provided with an outwardly disposed arm 44 which projects through the slot 45 produced in a wall of the tubular member 41 and extending lengthwise thereof.

When the shoe S operatively connected with a block 40 is in its raised or inoperative position, said block is positoned at the upper porton of the tubular member 41 and is engaged from below by the upper end portion of a holding lever 46. The adjacent portion of the wall of the member 41 is provided with an opening 47 to permit said end portion of the lever 46 to enter the member 41. When the lever 46 is so engaged with a block 40, the shoe S is maintained against downward movement but immediately acts when the lever 46 is freed from said block 40.

The lever 46 is pivotally connected at a desired point intermediate its ends, as at 48, with the tubular member 41, the portion of the lever 46 below its pivotal mounting 48 extending within a kerf 49 produced in an end portion of a releasing block 50.

The block 50, as is clearly illustrated in Figure 9 of the drawings, is interposed between the lower portions of both of the levers 46 and held thereby, said portions being effectively maintained within the kerfs 49 by the retractile member or spring 51 interposed between and connected to the lower extremities of the levers 46. As the block 50 is moved downwardly, both of the blocks 40 will be released at substantially the same time permitting both of the shoes S to fall into working position but, when it is desired to release only one of the shoes, the block 50 is moved endwise toward one of the levers 46 holding such shoe in its raised position. This movement of the block 50 is permitted without any action or effect upon the second lever due to the fact that each of the kerfs 49 is open. The use of a single shoe is particularly required when it is desired to prevent skidding of the car and especially when making a turn.

The upper surface of the block 50 is provided thereacross with a transversely disposed groove 52 in which is received the inner portion of an operating handle or lever 53. This lever or handle 53 has universal connection, as at 54, with the steering column C, as particularly illustrated in Figure 10 of the drawings. This handle 53 may be readily moved downward to effect release of both of the shoes or may be swung laterally in either direction in accordance with the single shoe desired to be released.

Each of the tubular members 41 has arranged in the lower portion thereof a cushion spring 55 with which a block 40 contacts when released and as the associated shoe S drops into working position. The arm 44 carried by the block 40 provides means whereby the same may be readily drawn upwardly of the member 41 but, in practice, each of the shoes S is manually returned to its raised or inoperative position by direct lifting of the shoe.

It is to be noted that when one of the shoes S is in working position with respect to a wheel, the travel of the vehicle is partially braked but when both of the shoes are in working position, the vehicle is effectively brought to a stop regardless of all of the operating conditions. When either or both of the brake shoes S are applied the strain is thrown upon the chassis of the vehicle and when it is desired to release the shoes after the vehicle has stopped, it is only necessary to reverse the vehicle.

From the foregoing description it is thought to be obvious that an emergency brake mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. The combination with vertically movable supports arranged near the wheels of a vehicle, of a shoe carried by each of the supports and adapted to be moved beneath a wheel, means for normally maintaining the shoes in an inoperative position, and a single means operating to release the shoes in unison or to singly release any one of the shoes.

2. The combination with the chassis of a vehicle and a supporting wheel therefor, of a housing carried by said chassis, a rod having an end portion extending within said housing and having vertical swinging movement, a shoe connected to the opposite end portion of the rod and adapted to move beneath the wheel, and means within the housing operated by the rod for holding the shoe against upward movement when engaged beneath the wheel.

3. The combination with the chassis of a vehicle and a supporting wheel therefor, of a housing carried by said chassis, a rod having an end portion extending within said housing and having vertical swinging movement, a shoe connected to the opposite end portion of the rod and adapted to move beneath the wheel, blocks within the housing normally free of sliding movement therein, and means carried by the rod coacting with the blocks to lock the blocks to the housing to hold the shoe against upward movement when engaged beneath the wheel.

4. The combination with the chassis of a vehicle and a supporting wheel therefor, of a housing carried by said chassis, a rod having an end portion extending within said housing and having vertical swinging movement, a shoe connected to the opposite end portion of the rod and adapted to move beneath the wheel, blocks within the housing normally free of sliding movement therein, and means carried by the rod coacting with the blocks to lock the blocks to the housing to hold the shoe against upward movement when engaged beneath the wheel, a wall of the housing being provided with a vertically disposed slot through which the rod extends.

5. The combination with the chassis of a vehicle and a supporting wheel therefor, of a housing carried by said chassis, a rod having an end portion extending within said housing and having vertical swinging movement, a shoe connected to the opposite end portion of the rod and adapted to move beneath the wheel, blocks within the housing normally free of sliding movement therein, means carried by the rod coacting with the blocks to lock the blocks to the housing to hold the shoe against upward movement when engaged beneath the wheel, and a mounting for the rod arranged exteriorly of the housing.

6. The combination with the chassis of a vehicle and a supporting wheel therefor, of a housing carried by said chassis, a rod having an end portion extending within said housing and having vertical swinging movement, a shoe connected to the opposite end portion of the rod and adapted to move beneath the wheel, blocks within the housing normally free of sliding movement therein, means carried by the rod coacting with the blocks to lock the blocks to the housing to hold the shoe against upward movement when engaged beneath the wheel, and spring means engaged with the rod to impart movement to the shoe into working position with respect to the wheel.

7. The combination with a vehicle chassis and a supporting wheel therefor, of a sliding member supported by the chassis for movement in a direction toward said supporting wheel, a vertically movable support arranged near the wheel, a shoe carried by said support and adapted to be moved beneath the wheel, a rod interposed between and pivotally connected with the sliding member and the shoe, means for holding the shoe in an inoperative position, means for releasing said shoe, and a tubular member into which the sliding member extends.

8. The combination with a vehicle chassis and a supporting wheel therefor, of a sliding member supported by the chassis for movement in a direction toward said supporting wheel, a vertically movable support arranged near the wheel, a shoe carried by said support and adapted to be moved beneath the wheel, a rod interposed between and pivotally connected with the sliding member and the shoe, means for holding the shoe in an inoperative position, means for releasing said shoe, a tubular member into which the sliding member extends, and cushioning means within the tubular member for coaction with the sliding member when the same moves inwardly of the tubular member.

9. In combination with a vehicle chassis, supporting wheels therefor, vertically movable members supported by the chassis, shoes carried by said members and adapted to have movement beneath the wheels, guideways carried by the chassis, blocks movable in said guideways, an operative connection between each of the blocks and one of the shoes whereby said shoe is held in a raised position when the block is in one position with respect to its guideway, and a latch for holding each of the blocks in such upper position.

10. In combination with a vehicle chassis, supporting wheels therefor, vertically movable members supported by the chassis, shoes carried by said members and adapted to have movement beneath the wheels, guideways carried by the chassis, blocks movable in said guideways, an operative connection between each of the blocks and one of the shoes whereby said shoe is held in a raised position when the block is in one position with respect to its guideway, a latch for holding each of the blocks in such upper position, and means coacting with the latches selectively operating to release the latches in unison or one independently of the other.

In testimony whereof I hereunto affix my signature.

CHRISTIAN REBER.